United States Patent
Burris et al.

(10) Patent No.: US 10,495,162 B2
(45) Date of Patent: Dec. 3, 2019

(54) DISC BRAKE ROTOR ASSEMBLY

(71) Applicant: CONSOLIDATED METCO, INC., Vancouver, WA (US)

(72) Inventors: Jared Wiley Richard Burris, Vancouver, WA (US); Pavan Kumar Dunna, Camas, WA (US); Nazar Ventaminovich Demenko, Vancouver, WA (US); Darren Kirk Johnson, Camas, WA (US); Jonathan David Harrington, Vancouver, WA (US); Keith Darran Mann, West Linn, OR (US); William Joseph Edwards, Portland, OR (US)

(73) Assignee: Consolidated Metco, Inc., Vancouver, WA (US)

( * ) Notice: Subject to any disclaimer, the term of this patent is extended or adjusted under 35 U.S.C. 154(b) by 155 days.

(21) Appl. No.: 15/700,955

(22) Filed: Sep. 11, 2017

(65) Prior Publication Data

US 2019/0078632 A1    Mar. 14, 2019

(51) Int. Cl.
*F16D 65/12*    (2006.01)
*B60B 27/00*    (2006.01)
(Continued)

(52) U.S. Cl.
CPC ........ *F16D 65/123* (2013.01); *B60B 27/0052* (2013.01); *B60B 27/042* (2013.01);
(Continued)

(58) Field of Classification Search
CPC ........... F16D 65/123; F16D 2065/1384; F16D 2065/1356; F16D 2065/1396; F16D 2065/1376; B60B 27/0052
(Continued)

(56) References Cited

U.S. PATENT DOCUMENTS 5,634,535 A * 6/1997 Fennell ................ F16D 65/126
                                                    188/218 XL
6,446,765 B1 * 9/2002 Dabertrand ............ F16D 65/12
                                                    188/18 A
(Continued)

FOREIGN PATENT DOCUMENTS

DE        102007056748 A1    5/2009

OTHER PUBLICATIONS

International Search Report and Written Opinion in corresponding International Application No. PCT/US2018/050363, dated Nov. 20, 2018, 11 pages.

*Primary Examiner* — S. Joseph Morano
*Assistant Examiner* — Jean W Charleston
(74) *Attorney, Agent, or Firm* — Fitch, Even, Tabin & Flannery LLP

(57) ABSTRACT

An assembly to secure a disc brake rotor to a wheel hub utilizing spring pins and a retaining ring is provided. A partial keyway is formed in the rotor, and a partial keyway is formed in the wheel hub. The rotor is fitted over an inwardly extending section of the hub, with the partial keyways in the rotor and in the wheel hub being aligned to form complete keyways. The spring pins are then press fit into the completed keyways. Finally, a retaining ring is installed into a slot formed in the inwardly extending section of the wheel hub to complete the assembly of the disc brake rotor assembly.

24 Claims, 11 Drawing Sheets

(51) Int. Cl.
  *B60B 27/04*    (2006.01)
  *F16D 65/02*    (2006.01)
(52) U.S. Cl.
  CPC ............. *F16D 2065/1356* (2013.01); *F16D 2065/1376* (2013.01); *F16D 2065/1384* (2013.01); *F16D 2065/1392* (2013.01); *F16D 2065/1396* (2013.01)
(58) Field of Classification Search
  USPC ...................................... 301/6.3, 6.8, 105.1
  See application file for complete search history.

(56) References Cited

U.S. PATENT DOCUMENTS

| | | | |
|---|---|---|---|
| 6,978,866 B2* | 12/2005 | Niebling ................ | F16D 65/12 188/18 A |
| 7,163,091 B2 | 1/2007 | Shamine | |
| 7,934,777 B1* | 5/2011 | Yuhas ...................... | B60B 3/16 188/18 A |
| 8,061,785 B2* | 11/2011 | Ilg ........................... | F16D 65/12 188/18 A |
| 2004/0226786 A1* | 11/2004 | Shamine ................ | F16D 65/12 188/218 XL |
| 2009/0218878 A1* | 9/2009 | Lippis ..................... | F16D 65/12 301/6.8 |
| 2011/0062772 A1* | 3/2011 | White .................... | B60B 27/001 301/110 |
| 2016/0025165 A1 | 1/2016 | Plantan | |

* cited by examiner

DISC BRAKE ROTOR ASSEMBLY

BACKGROUND OF THE INVENTION

Disc brake rotors, for example, disc brake rotors used in commercial vehicles, are typically comprised of cast iron. Such disc brake rotors are mounted adjacent wheel hubs which can be comprised of cast aluminum or cast iron. It is desirable to attach the disc brake rotor to the wheel hub in a manner that is secure, yet straightforward.

An object of the invention is, therefore, to provide an assembly wherein a disc brake rotor is secured to a wheel hub in a commercial vehicle.

SUMMARY OF THE INVENTION

An assembly to secure a disc brake rotor to a wheel hub in accordance with an embodiment of the present invention utilizing spring pins and a retaining ring is provided. A partial keyway is formed in the rotor, and a partial keyway is formed in the wheel hub. The rotor is fitted over an inwardly extending section of the hub, with the partial keyways in the rotor and in the wheel hub being aligned to form complete keyways. The spring pins are then press fit into the completed keyways. Finally, a retaining ring is installed into a groove formed in the inwardly extending section of the wheel hub to complete the assembly of the disc brake rotor assembly.

Other embodiments of assemblies to retain a disc brake rotor on a wheel hub will be described in the detailed description.

DETAILED DESCRIPTION OF THE INVENTION

Figure 1:
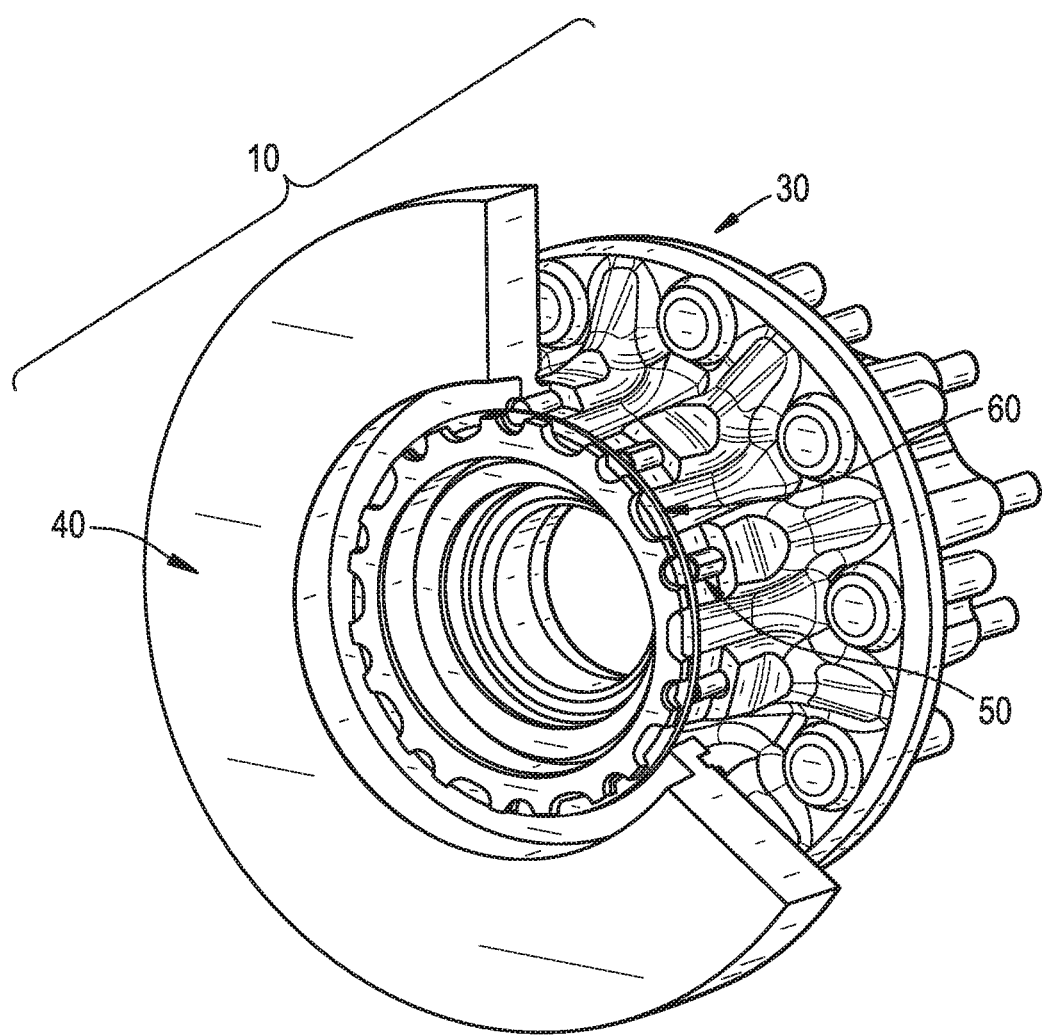
FIG. 1 is a perspective view in partial cross section of a disc brake rotor assembly in accordance with a first embodiment of the present invention.

FIG. 1 shows the hub and rotor assembly 10. The details focus on the joint that is established between the wheel hub 30 and the brake rotor 40.

Figure 2:
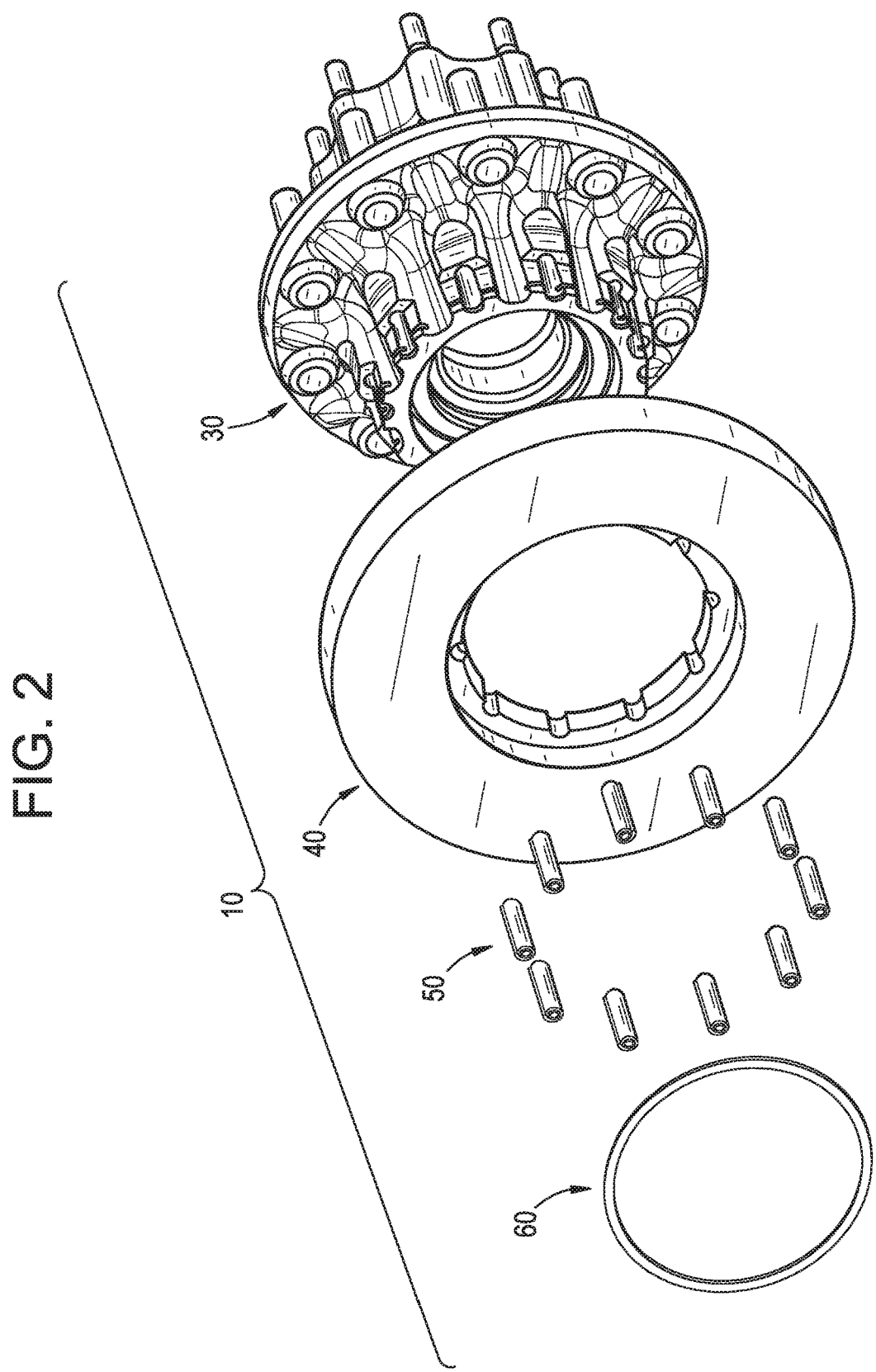
FIG. 2 is a perspective exploded view with components shown of a disc brake rotor assembly in accordance with a first embodiment of the present invention.
Figure 3:
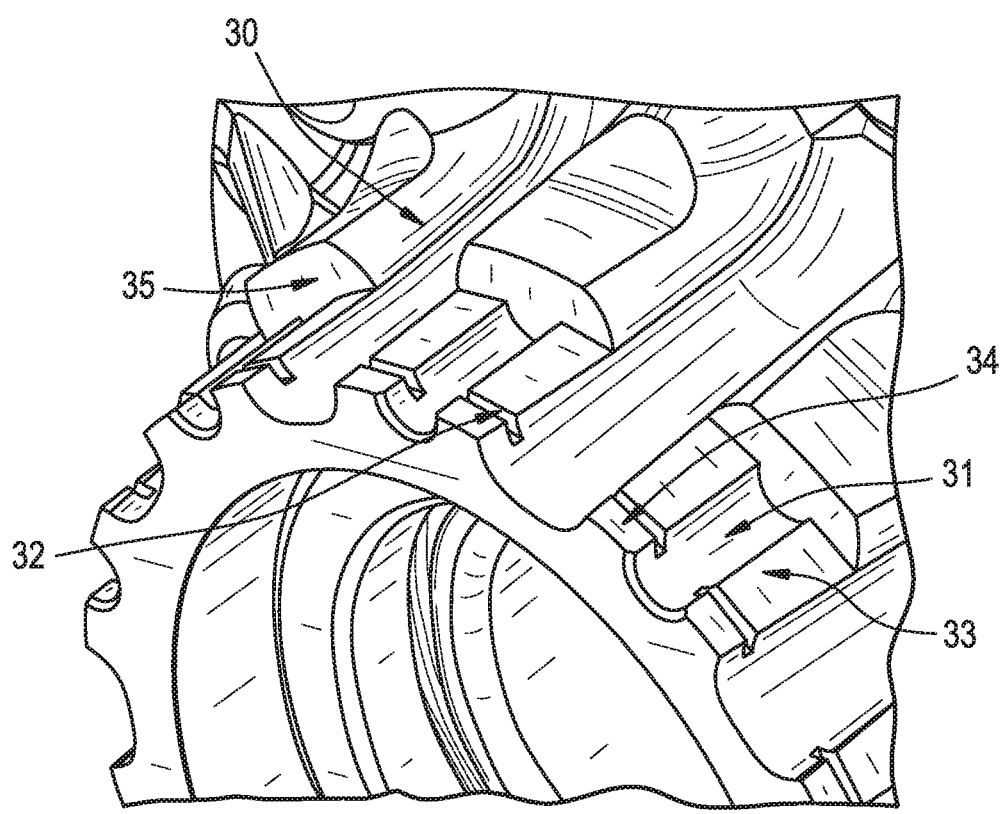
FIG. 3 is a detailed partial perspective view of the inwardly extending wheel hub interface in accordance with a first embodiment of the present invention.
Figure 4:
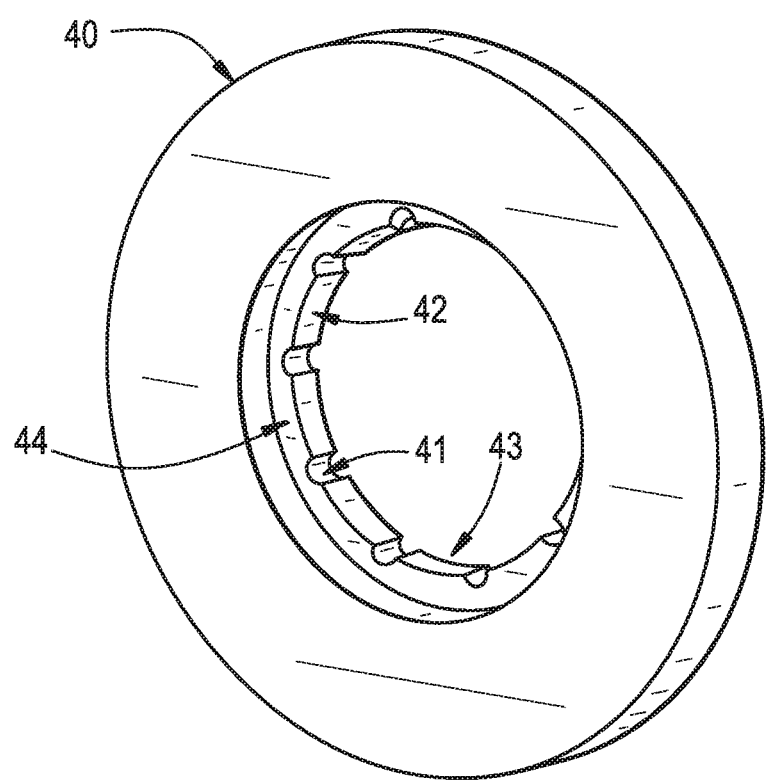
FIG. 4 is a perspective view of a disc brake rotor in accordance with a first embodiment of the present invention.
Figure 5:
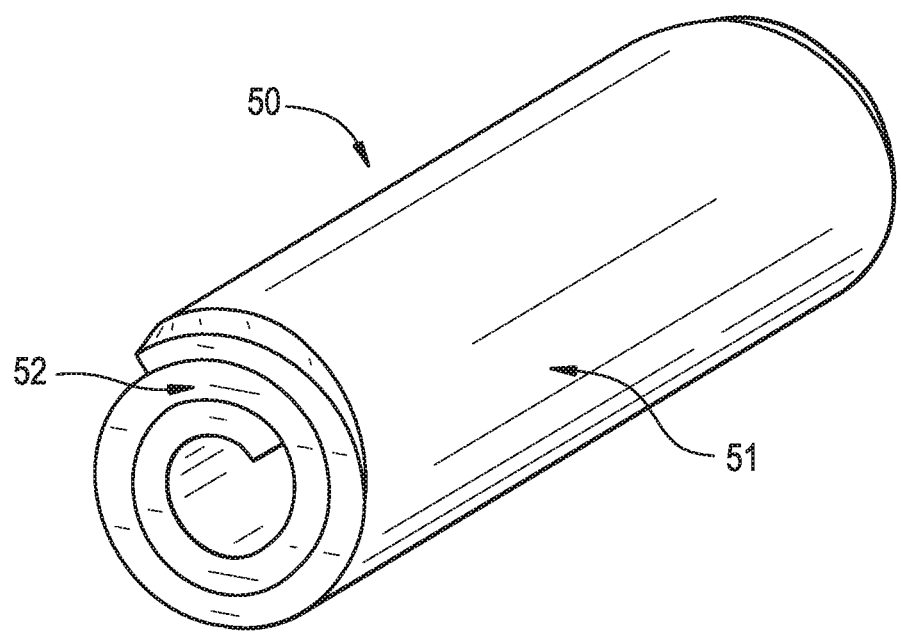
FIG. 5 is a perspective view of a spring pin in accordance with all embodiments of the present invention.
Figure 6:
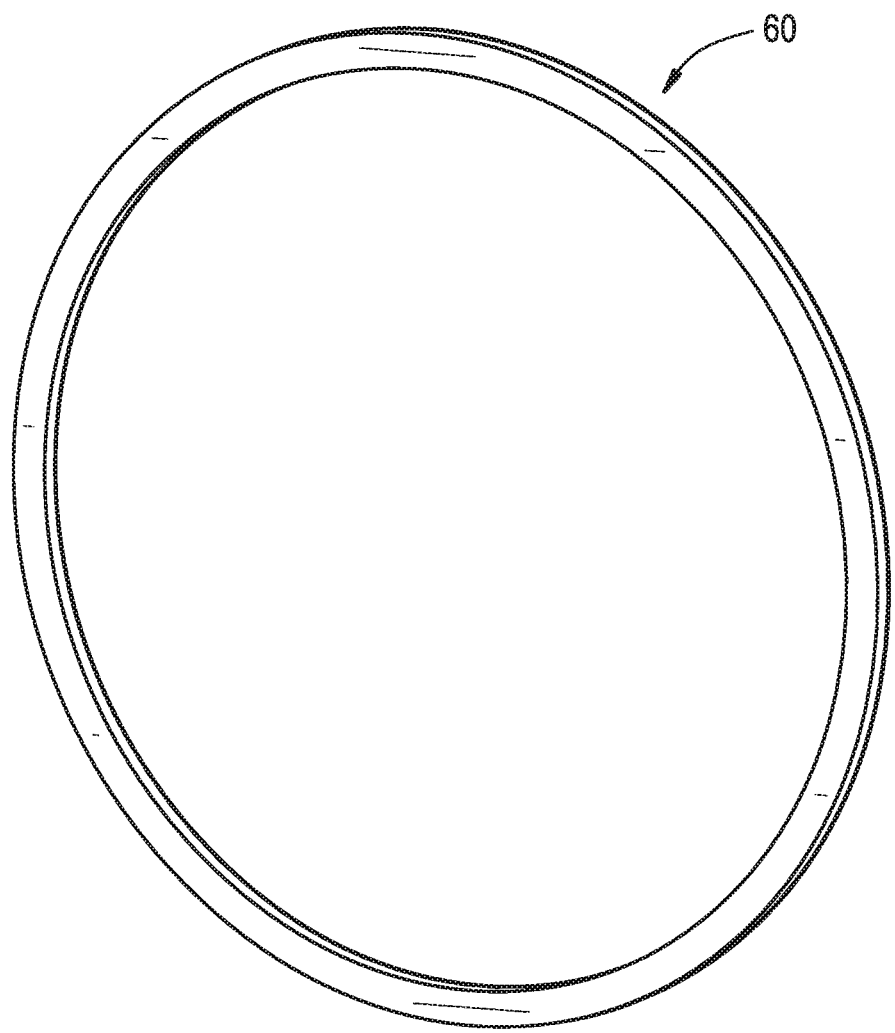
FIG. 6 is a perspective view of a retaining ring in accordance with a first, second, third, or fourth embodiment of the present invention.

As shown in FIGS. 2-4, assembly operations that are required to create hub and rotor assembly 10, involve first installing brake rotor 40 onto wheel hub 30 using the hub pilot 33 and rotor pilot 42 for alignment. The brake rotor 40 is then clocked so that hub pin slot 31 and rotor pin slot 41 are aligned to form keyways. A plurality of spring pin 50 are then installed into the completed keyways until the pins are seated against hub pilot seat 35. Retaining ring 60 is then installed over retaining ring pilot 34 until it fits properly into retaining groove 32. The hub and rotor assembly 10 is now assembled.

Referring now to FIGS. 1-3, brake rotor 40 is shown attached to wheel hub 30 using a plurality of spring pin 50 to prevent torsional rotation of the brake rotor 40 relative to wheel hub 30. Retaining ring 60 is shown installed in retaining groove 32 which prevents brake rotor 40 from being able to move axially inward relative to wheel hub 30 while hub pilot seat 35 prevents brake rotor 40 from being able to move axially outward relative to wheel hub 30. Together, the wheel hub 30, the brake rotor 40, the plurality of spring pin 50 and the retaining ring 60 comprise hub and rotor assembly 10.

As shown in FIGS. 3-6, wheel hub 30 has features machined on the inward end of the hub which create the interface between brake rotor 40, spring pin 50 and retaining ring 60. Hub pin slot 31 provides one-half of the keyway which nests the spring pin outer surface 51. Hub pilot 33 interfaces with rotor pilot 42 and is used to align brake rotor 40 when installed onto wheel hub 30. Rotor pilot seat 35 serves as an axial stop for both rotor outward face 43 and the end surface of spring pin 52. Retaining groove 32 is machined into the inwardly extending surface of wheel hub 30 and is used to axially constrain retaining ring 60 when it is installed. Retaining ring pilot 34 is slightly smaller than hub pilot 33 and may or may not be tapered so that retaining ring 60 can be properly installed.

In FIG. 4, brake rotor 40 also has machined features along its inner diameter interface. Rotor pin slot 41 provides the second part of the keyway which nests the spring pin outer surface 51. When brake rotor 40 is assembled with wheel hub 30, the brake rotor must be positioned so that rotor pin slot 41 and hub pin slot 31 are aligned and form a complete keyway.

Figure 7:
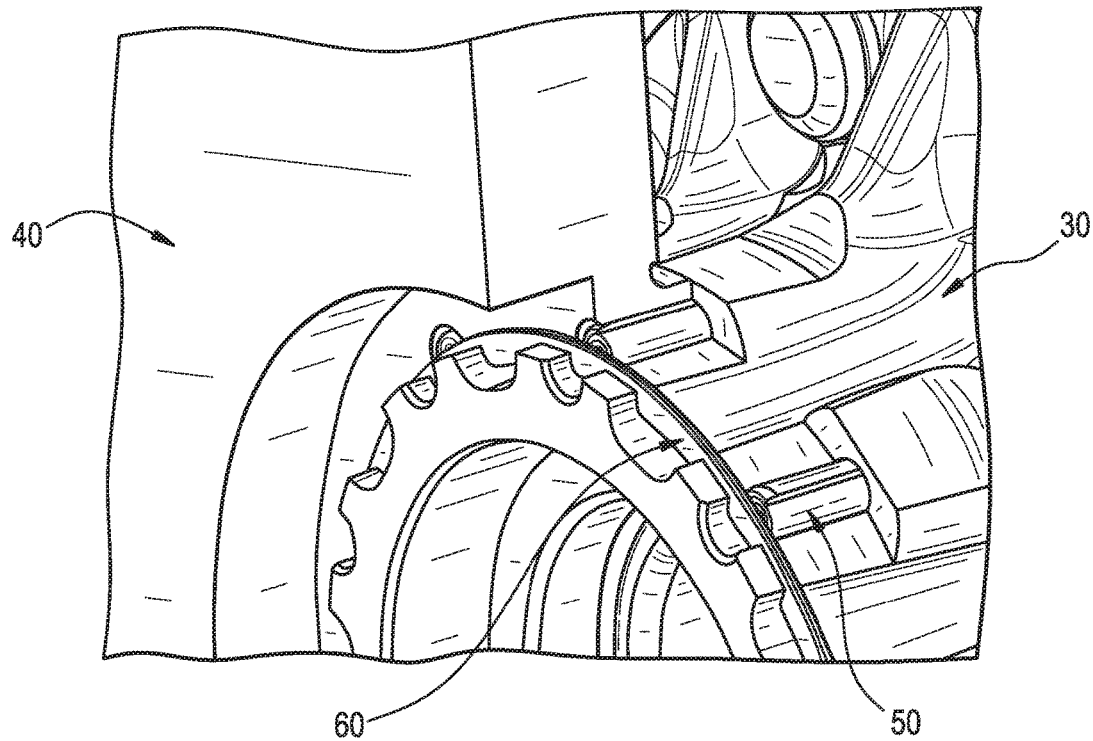
FIG. 7 is a detailed partial perspective view in partial cross section of a disc brake rotor assembly in accordance with a first embodiment of the present invention.

FIG. 7 shows spring pin 50 utilized as a key in the keyway created by hub pin slot 31 and rotor pin slot 41. When under load, spring pin 50 is able to radially compress allowing spring pin 50 to absorb shock and vibrations that are transferred between brake rotor 40 and wheel hub 30 during vehicle braking operations. In its function as a key, spring pin 50 is able to physically constrain brake rotor 40 relative to wheel hub 30 which is an improvement over hub and rotor assemblies which rely on a friction couple to constrain a rotor to a wheel hub.

Figure 8:
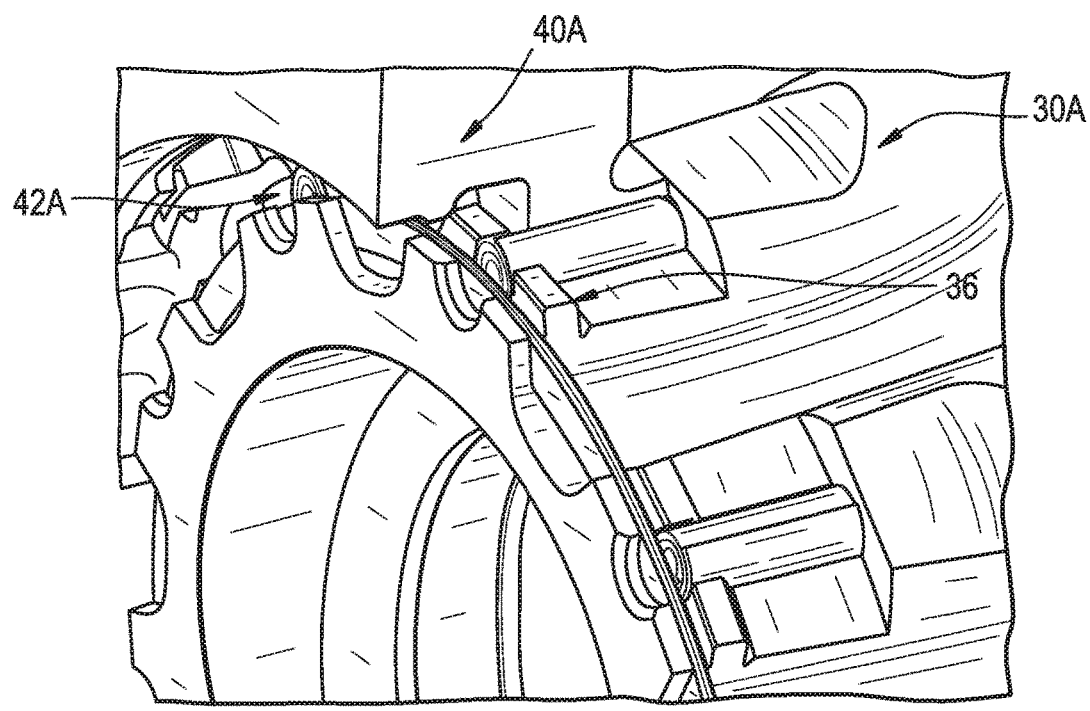
FIG. 8 is a detailed partial perspective view in partial cross section of a disc brake rotor assembly in accordance with a second embodiment of the present invention.

FIG. 8 illustrates a variation of the disc brake rotor assembly. In this variation, the wheel hub 30A includes hub stop tab 36 which acts against rotor inward face 44 so that the axial loads transferred from the rotor are applied directly to wheel hub 30A instead of to the retaining ring 60. This allows for retaining ring 60 to only support the plurality of spring pins 50. In order to assemble this design, brake rotor 40A is modified so that rotor pilot 42A has interrupted cut features that allow for the rotor to be installed over wheel hub 30A, then positioned to align hub pin slot 31 and rotor pin slot 41.

Figure 9:
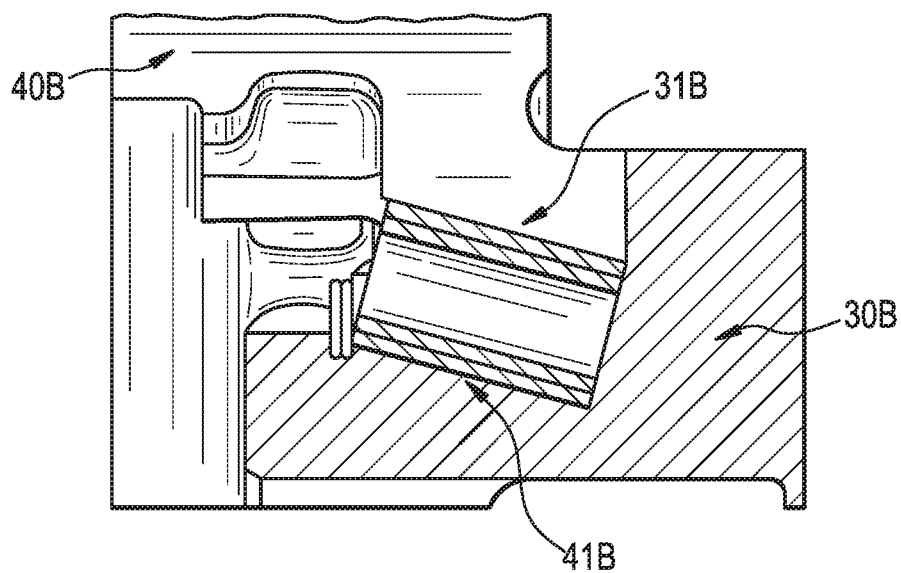
FIG. 9 is a detailed partial side view in cross section of a disc brake rotor assembly in accordance with a third embodiment of the present invention.

FIG. 9 illustrates a variation of the disc brake rotor assembly. In this variation, hub pin slot 31B and rotor pin slot 41B are machined in an angled manner about the axis of wheel hub 30B. The benefit of this variation is that spring pin 50 is now able to constrain the brake rotor 40B to the wheel hub 30B both axially and rotationally.

Figure 10:
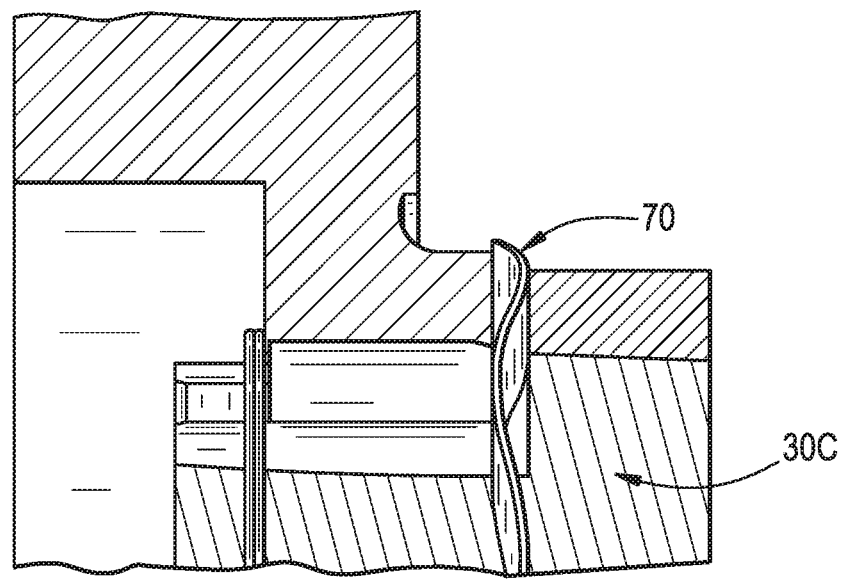
FIG. 10 is a detailed partial side view in partial cross section of a disc brake rotor assembly in accordance with a fourth embodiment of the present invention.

FIG. 10 illustrates a variation of the disc brake rotor assembly. In this variation, a spacer 70 is included in hub and rotor assembly 10 and is positioned between hub pilot seat 35 and rotor outward face 43. The benefit that spacer 70 provides is that it absorbs any axial gap tolerance between brake rotor 40 and wheel hub 30C when assembled.

Figure 11:
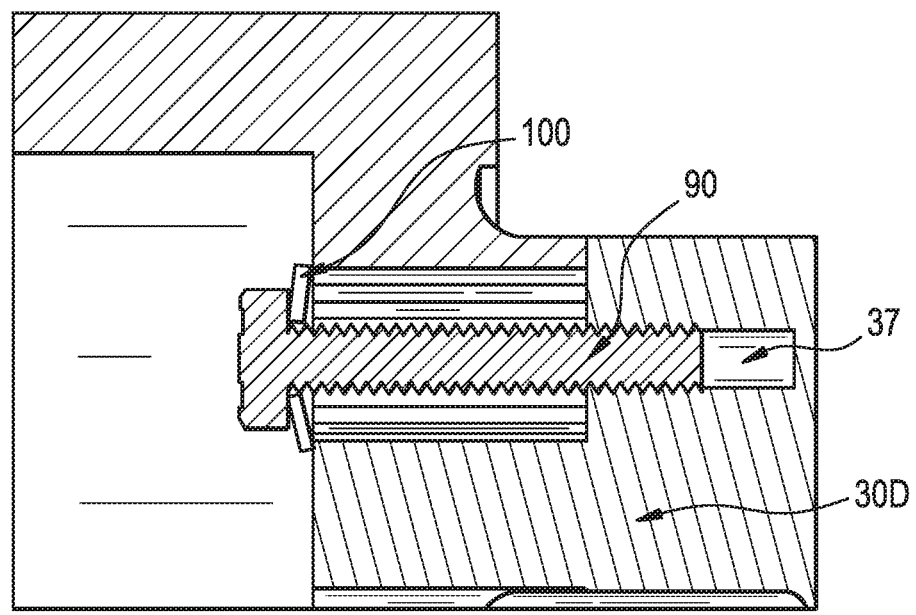
FIG. 11 is a detailed partial side view in cross section of a disc brake rotor assembly in accordance with a fifth embodiment of the present invention.

FIG. 11 illustrates a variation of the disc brake rotor assembly. In this variation, fastener 90 and washer 100 are used together to axially constrain brake rotor 40 to wheel hub 30D. Wheel hub 30D is modified with hub threaded hole 37 which fastener 90 threads into. This design provides an alternate method of axially constraining brake rotor 40 to wheel hub 30D without the use of a retaining ring.

What is claimed is:
1. A disc brake rotor assembly comprising:
a plurality of pins each having an outer circumference,
a disc brake rotor having a first plurality of partial keyways each configured to extend around less than the entire outer circumference of one of the pins,
a wheel hub having a second plurality of partial keyways each configured to extend around less than the entire outer circumference of one of the pins,
the disc brake rotor installed on the wheel hub such that the partial keyways in the disc brake rotor and the partial keyways in the wheel hub are aligned to form completed keyways, and
each pin in one of the completed keyways.
2. The disc brake rotor assembly of claim 1,
wherein each pin is press fitted into each completed keyway.
3. The disc brake rotor assembly of claim 1,
wherein the wheel hub has an inward end with the second plurality of partial keyways and the disc brake rotor includes an axially centered opening that receives the wheel hub inward end with the plurality of partial keyways.
4. The disc brake rotor assembly of claim 1,
wherein the completed keyway is at an angle from a central axis of the disc brake rotor assembly.
5. The disc brake rotor assembly of claim 1,
wherein the wheel hub includes a retaining groove in which a retaining ring is fitted.
6. The disc brake rotor assembly of claim 1, wherein the pins are spring pins.
7. A disc brake rotor assembly comprising:
a disc brake rotor having a plurality of partial keyways and a central opening,
a wheel hub having a plurality of partial keyways and a central opening,
the disc brake rotor installed on the wheel hub such that the partial keyways in the disc brake rotor and the partial keyways in the wheel hub are aligned to form completed keyways, and
a plurality of elongate spring pins each having a length, each spring pin inserted into one of the completed keyways,
the disc brake rotor and the wheel hub being rotatable about a central axis that extends through centers of the central openings of the disc brake rotor and the wheel hub, and
the completed keyways orienting the pins so that the lengths thereof extend parallel to the central axis.
8. The disc brake rotor assembly of claim 7,
wherein each spring pin is press fitted into each completed keyway.
9. The disc brake rotor assembly of claim 7,
wherein the wheel hub includes an inward end with the plurality of partial keyways and the disc brake rotor includes an axially centered opening that receives the wheel hub inward end with the plurality of partial keyways.
10. The disc brake rotor assembly of claim 7,
wherein each completed keyway has an open end that receives one of the spring pins and a closed end opposite the open end.
11. The disc brake rotor assembly of claim 7,
wherein the wheel hub includes a retaining groove in which a retaining ring is fitted.
12. A disc brake rotor assembly comprising:
a disc brake rotor having a plurality of partial keyways with first arcuate surfaces,
a wheel hub having a plurality of partial keyways having second arcuate surfaces,
the disc brake rotor installed on the wheel hub such that the partial keyways in the disc brake rotor and the partial keyways in the wheel hub are aligned to form completed keyways with the first and second arcuate surfaces of each completed keyway facing each other,
a plurality of pins, each pin inserted into one of the completed keyways and held between the facing, first and second arcuate surfaces of the one completed keyway, and
a spacer adjacent the wheel hub and the disc brake rotor.
13. The disc brake rotor assembly of claim 12,
wherein each pin is a spring pin that is press fitted into each completed keyway.
14. The disc brake rotor assembly of claim 12,
wherein the wheel hub includes an inward end with the plurality of partial keyways and the disc brake rotor includes an axially centered opening that receives the wheel hub inward end with the plurality of partial keyways.
15. The disc brake rotor assembly of claim 12,
wherein the wheel hub includes an inward end having an edge against which the spacer is fitted.
16. The disc brake rotor assembly of claim 15,
wherein the spacer is a spring.
17. The disc brake rotor assembly of claim 12,
wherein the wheel hub includes a retaining groove in which a retaining ring is fitted.
18. A disc brake rotor assembly comprising:
a disc brake rotor having a plurality of partial keyways and retaining grooves,
a wheel hub having an inward end with a plurality of partial keyways,
the disc brake rotor installed on the wheel hub such that the partial keyways in the disc brake rotor and the partial keyways in the wheel hub are aligned to form completed keyways,
a plurality of pins, each pin combined with a threaded fastener and then inserted into one of the completed keyways.

19. The disc brake rotor assembly of claim 18, wherein each pin is a spring pin that is press fitted into each completed keyway.

20. The disc brake rotor assembly of claim 18, wherein the disc brake rotor includes an axially centered opening that receives the wheel hub inward end with the plurality of partial keyways.

21. The disc brake rotor assembly of claim 18, wherein the wheel hub inward end includes a retaining groove in which a retaining ring is fitted.

22. A disc brake rotor assembly comprising:

a disc brake rotor having a plurality of partial keyways and retaining grooves, a wheel hub having an inward end with a plurality of partial keyways, the disc brake rotor installed on the wheel hub such that the partial keyways in the disc brake rotor and the partial keyways in the wheel hub are aligned to form completed keyways, a plurality of pins, each pin inserted into one of the completed keyways, and the wheel hub further comprising a stop tab adjacent each pin, wherein the wheel hub inward end includes a retaining groove in which a retaining ring is fitted.

23. The disc brake rotor assembly of claim 22, wherein each pin is a spring pin that is press fitted into each completed keyway.

24. The disc brake rotor assembly of claim 22, wherein the disc brake rotor includes an axially centered opening that receives the wheel hub inward end with the plurality of partial keyways.

* * * * *